F. L. McCARTY.
LUBRICATING WHEEL.
APPLICATION FILED JAN. 6, 1913.
1,105,033.
Patented July 28, 1914.
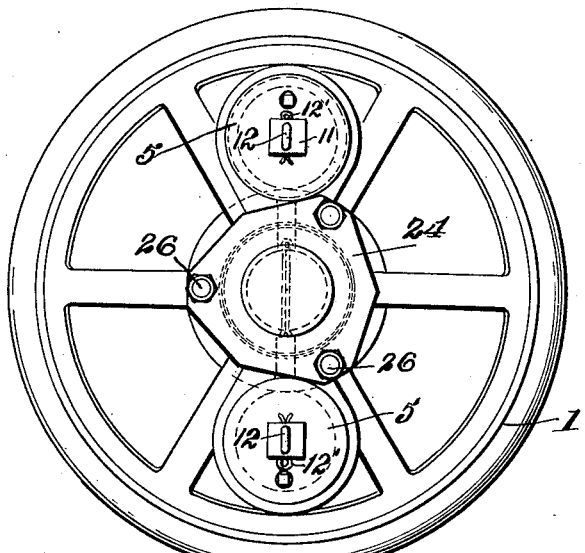
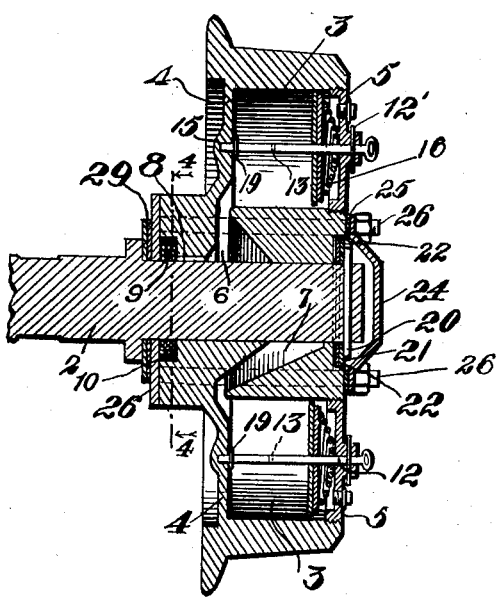
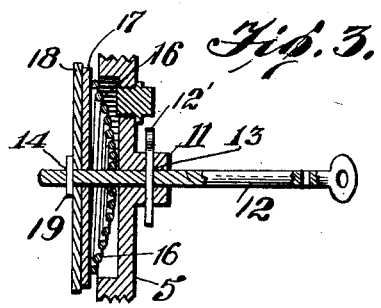
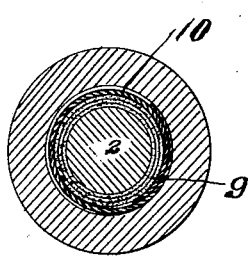
WITNESSES:
INVENTOR
FRANK L. McCARTY.
BY
William S. Jones
ATTORNEY

UNITED STATES PATENT OFFICE.

FRANK L. McCARTY, OF SUPERIOR, WYOMING, ASSIGNOR OF ONE-HALF TO WILLIAM J. HALLETT, OF ROCK SPRINGS, WYOMING.

LUBRICATING-WHEEL.

1,105,033.      Specification of Letters Patent.      Patented July 28, 1914.

Application filed January 6, 1913. Serial No. 740,468.

*To all whom it may concern:*

Be it known that I, FRANK L. McCARTY, a citizen of the United States, and residing at Superior, in the county of Sweetwater and State of Wyoming, have invented certain new and useful Improvements in Lubricating-Wheels, of which the following is a specification.

My invention relates to lubricating wheels for use on pit cars, mine cars, trucks, larries, and the like.

The objects of my invention are to provide a wheel of the character described which embodies simplicity of construction and economy of operation; to provide a wheel in which means are devised for an automatic and positive lubrication; and to provide a wheel in which the maximum surface at the point of its connection with the axle is lubricated in a thorough and extremely convenient manner.

To the accomplishment of the recited objects and others coördinate therewith, the preferred embodiment of my invention resides in that construction and arrangement of parts hereinafter described, illustrated in the accompanying drawings, and embraced within the scope of the appended claim.

In said drawings:—Figure 1 is a side elevation of the wheel embodying my invention; Fig. 2 is a central transverse sectional view of the wheel; Fig. 3 is a detail sectional elevation of the spring, plunger and screw plug in contracted relation, and Fig. 4 is a transverse section taken upon lines 4—4 of Fig. 2.

Broadly, my invention involves a car wheel provided with grease chambers at diametrically opposite points, the same having passages or apertures communicating with the axle in such manner that the entire longitudinal extent of the latter is thoroughly lubricated. In combination with the grease chambers I employ a pair of force feed lubricators which insure a positive and automatic supply of the lubricant through said passages. I have also devised means for securing an expeditious adjustment of the spring-controlled plunger which is utilized for expelling the grease from the chambers.

In said drawing the numerals 1 and 2 designate the usual types of car wheel and axle, respectively. Upon diametrically opposite sides of the wheel I provide a pair of circular grease chambers 3, the same terminating in rear walls as 4 and having screw plugs 5 adapted for engagement with their outer walls for the purpose of confining the lubricant. At the back and bottom of each chamber 3 there is a passage which communicates with the periphery of the axle 2. As will be found upon inspection of Fig. 2 of the drawing the upper passage 6 has a contracted portion immediately adjacent the chamber 3 and from this point it suddenly diverges outwardly or downwardly toward the axle, while the opposite passage 7 is disposed outwardly at a greater angle than its complemental passage 6, whereby it will be seen that both passages considered conjunctively afford broad openings or spaces which are practically a continuation of each other. Communicating with the passage 6 to the rear thereof is a horizontally arranged slot as 8, which serves to convey the grease to the circular packing 9 which is maintained in constant contact with the axle through the medium of a spring clip 10 as best seen in Fig. 4.

Each screw plug 5 is equipped with an integral head 11 having a cotter pin 12' extending transversely therethrough and also through a brass stem 12 which projects medially through said head. Just to one side of the center of the longitudinal extension of the stem 12 I provide an opening as 13, and at the outer extremity there is still another opening 14, the said extremity normally being seated in the recess 15 formed in the rear wall of the grease chamber, as clearly exhibited in Fig. 2 of the drawing. Encircling the stem 12 is a spiral spring 16 which is adapted to engage the plunger 17 arranged in close contact with a suitable leather washer 18.

In operation the chamber 3 is filled with grease, the pin 12' removed, and the stem 12 withdrawn until the pin 19 normally positioned in the opening 14 engages the inner face of the washer 18, whereupon the stem 12 is further constrained outwardly against the tension of the coiled spring 16, until the opening 13 in the said stem registers with the opening in the head 11 of the screw plug 5. The split pin 12' is then passed through the head and opening 13 to maintain a contracted relationship of the plunger 17, spring 16 and the screw plug 5, as will be seen in Fig. 3 of the drawing.

With the component parts in the position just described the plug 5 is screwed into the chamber 3 and the split pin 12' removed in order that the coiled spring 16 may expand and thus force the lubricant to the axle. Manifestly the lubricant will be expelled into the passages 6 and 7 in direct contact with the major portion of the axle 2, while some of the grease will pass through the slot in communication with the passage 6 and onto the packing 9. Since the construction and arrangement of the force feed lubricators are identical, the foregoing explanation will be sufficient for a full explication of both.

The outer terminal of the axle 2 extends a slight distance beyond the wheel proper and is secured by means of a pin 20, a pair of washers as 21 being interposed between the said pin and a recess 22 in the outer wall of the hub of the wall. Surrounding and inclosing the extended portion of the axle is a pressed steel cap 24, which, together with a rubber gasket 25, are fastened to the wheel by a plurality of bolts 26 which project entirely through the hub of the wheel and are secured at their opposite ends to the washer 26'. It will thus be seen that the packing 9 and the rubber gasket 25, taken in conjunction with the pressed steel cap 24 and washer 26', form two grease tight joints which prevent the dripping and consequent waste of the grease. It will also be pointed out that by reason of the particular fastening means employed for the pressed steel cap 24, the wheel may be removed or replaced with facility, or the packing 9 repaired or renewed without the slightest difficulty.

The advantages of the hereinbefore noted construction and arrangement will be obvious to those skilled in the art.

A wheel constructed in accordance with my invention has an easily accessible fastening and bearing through the arrangement of the pressed steel cap and washer secured to the wheel by means of the bolts 20; an automatic, positive acting grease chamber cast solid with the wheel and arranged so that the stems which guide the plungers used to force the lubricant from this chamber into the bearings, are at all times within the chambers and safe from injury; and apertures of novel shape and disposition which lead from the grease chamber to the bearing, the same insuring a direct and plentiful lubrication of the full length of the bearing. Moreover, both cups may be filled and the grease used from one alone by leaving the respective cotter pin 12' in engagement with its stem 12 until the grease from the other cup has been used up, so that one cup can be used as a reserve supply in the event that it is inconvenient to refill the emptied cup at the time the supply therein has been exhausted.

It should be understood that in its broader aspect the invention comprehends the employment not only of the various means described, but of equivalent means for performing the recited functions.

While the arrangement shown is thought at the present time to be preferable, it is desired to reserve the right to effect such modifications and variations thereof as may come fairly within the scope of the appended claim.

What is claimed, is:

A car wheel having its bore provided with annular enlargement at its inner end, a pair of grease containers carried by the wheel with passages leading to the bore, said bore, between one of said passages and said enlargement, being recessed longitudinally of the bore to provide a passageway, independent means disposed parallel with the bore and within said containers for placing the lubricant under pressure to deliver it to the bore through said passageways, said pressure-applying means being removable as a unit, and each provided with removable means for holding the same inactive at will while the other is free to perform its functions.

In testimony whereof I affix my signature in presence of two witnesses.

FRANK L. McCARTY.

Witnesses:
CLARE F. PHILBRICK,
T. M. HARTLEY.